Oct. 23, 1962
L. FUCHS
3,059,727
ENERGY ABSORPTION DEVICE
Filed Dec. 8, 1960
2 Sheets-Sheet 1
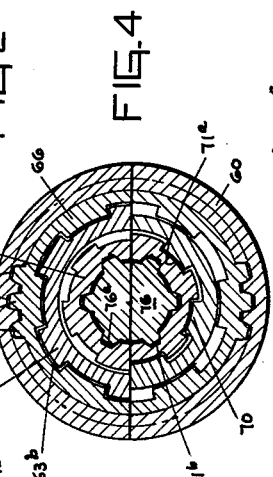
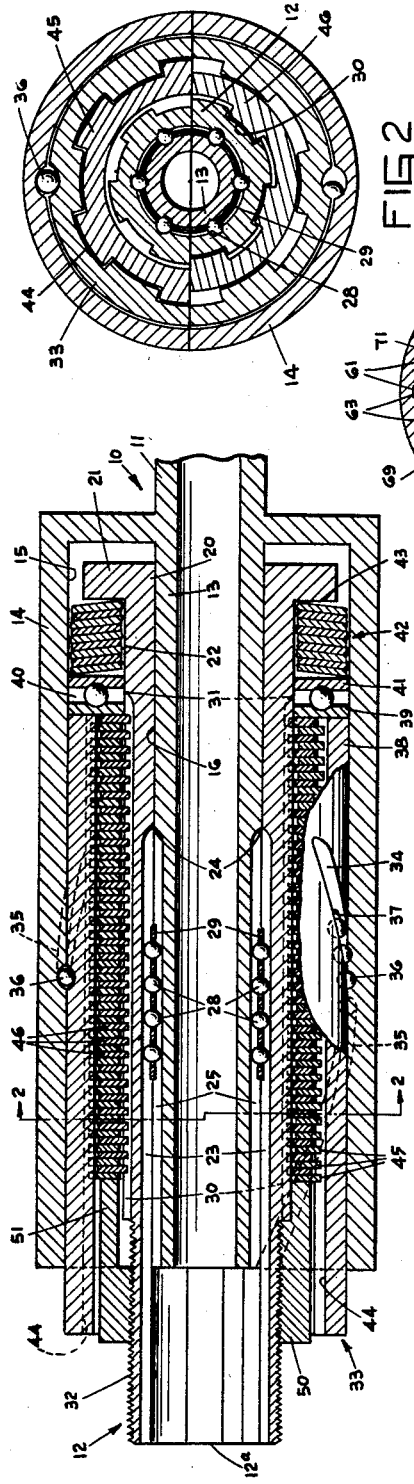
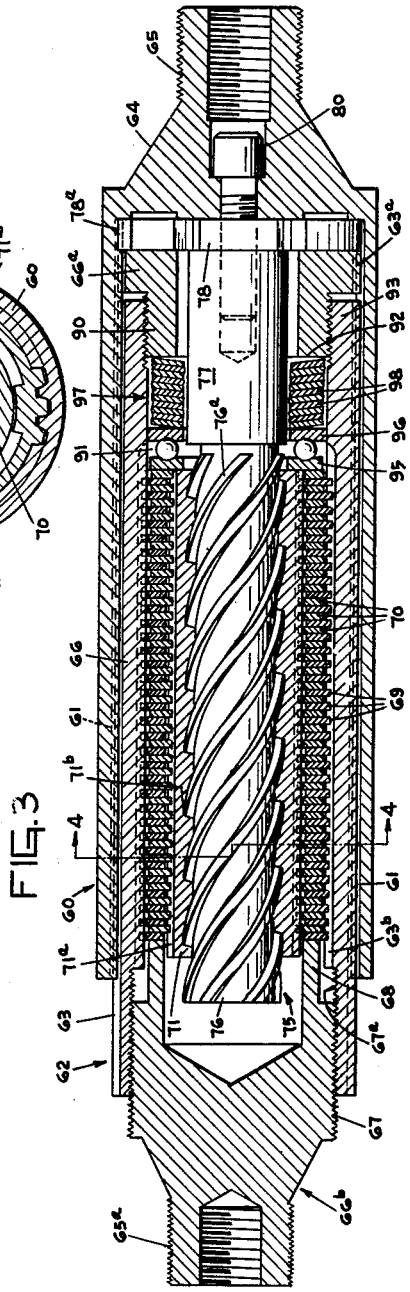
INVENTOR
LOUIS FUCHS
BY *Harry S. Shapiro*
ATTORNEY Oct. 23, 1962 L. FUCHS 3,059,727
ENERGY ABSORPTION DEVICE
Filed Dec. 8, 1960 2 Sheets-Sheet 2

INVENTOR
LOUIS FUCHS
BY Harry S. Shapiro
ATTORNEY

United States Patent Office 3,059,727
Patented Oct. 23, 1962

3,059,727
ENERGY ABSORPTION DEVICE
Louis Fuchs, East Orange, N.J., assignor to Airborne Accessories Corporation, Hillside, N.J., a corporation of New Jersey
Filed Dec. 8, 1960, Ser. No. 74,514
13 Claims. (Cl. 188—1)

The invention relates to energy absorbing devices, and is more particularly directed to devices that absorb and dissipate high energy impact loadings. This application is a continuation-in-part of my pending application, Serial No. 828,809, filed July 22, 1959, now abandoned.

Modern, high speed aircraft, particularly of the military type, may impose serious, and often fatal, impact loadings to occupants in the event of barrier or impact crashes, or an overly hard landing. It has been determined that in a barrier crash, a deceleration force of 30 G or more may be developed within a period of as short duration as 0.033 second. Subjecting the occupant of the plane to a direct impact load of such magnitude causes serious vertebrae injury. On the other hand, it has been determined that a pilot positioned and secured in a usual aircraft seat can tolerate an impact loading of approximately 18 G.

In most aircraft, space is limited. Any energy absorption device which may be utilized must be small and compact. Also, the extent that the device may change its external dimensions from its ready position in operating to absorb an excessive load is limited. When it is considered that the weight of a man, his equipment and the seat he occupies totals approximately 300 pounds, and that an impact loading of approximately 30 G or more must be so drastically reduced to be tolerable, it will be apparent that the factor of limited space greatly complicates the solution of the problem.

In addition to absorbing an inordinately large amount of energy in a relatively small or confined space, it is desirable that the energy absorption device shall function or act as a rigid member at G loadings which are tolerable or below a predetermined value. If the means to absorb and dissipate the excess impact loading possesses elastic characteristics giving rise to a rebound effect, the consequence of such effect on the occupant of the plane may be as injurious as the very condition it is intended to overcome or avoid. Also, for the particular application under consideration, the energy absorption device must be dependably operable at the extreme ranges of temperature and humidity conditions encountered, including icing.

Another important attribute of any device used to absorb an excess impact loading in the application under consideration is that it may be reliably testable before assembly for operative use with the seat; a human life depends upon proper functioning of the device.

It has been proposed to provide shock absorbers of the type which involve the crushing, shearing or elongation of a member subjected to the shock loading. Devices of this type possess the serious shortcoming that they are not testable or calibratable; a functionally predeterminative test destroys the product's usefulness.

It has been proposed to utilize shock absorbers of the hydraulic type. The operating characteristics of devices of this type however, are undesirably affected and unpredictable over the extreme range of temperatures encountered, including icing.

Mere spring arrangements do not provide the desired rigidity within safe landing limits. Moreover, devices which depend for their operability solely upon elastic properties furnish undesirable rebound effects.

In accordance with my invention, an energy absorption device is provided which acts as a rigid member at a safe, and below a predetermined impact load. The device is calibratable and testable so that it functions to reliably absorb an impact load applied thereto only when the set and predetermined value is exceeded, thereby limiting the maximum force which is transmitted to the "protected" load. The device is practically a pure energy absorber; it does not possess any appreciable elastic characteristics, and it does not give rise to the effects of rebound. The device is operable substantially independently of environmental conditions, such as vibration, temperature and humidity. Although the device of the invention is capable of absorbing and dissipating an inordinately large amount of energy, the operating parts thereof are confined in a comparatively small envelope. When a loading of a magnitude greater than the set, predetermined value is applied to the mechanism, the parts thereof are displaced only a relatively small extent beyond its initially minimally sized envelope. When an impact force in excess of the predetermined safe amount is encountered, the device instantaneously, reliably and smoothly dissipates the excess energy. The device is reusable; after exercising its function of absorbing excess energy it may again be tested and set in readiness to function reliably.

While the energy absorption device of the invention is particularly suitable for use in conjunction with an aircraft seat, and will hereinafter be described with relation to such preferred use, it will be understood that the uses thereof are not restricted to this particular application. The device of the invention may be used for aircraft landing gear, for astronaut capsule return, etc.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a longitudinal sectional view, partly in elevation, showing an energy absorption device made in accordance with the invention;

FIG. 2 is a vertical cross-sectional view taken approximately in the planes of line 2—2 of FIG. 1;

FIG. 3 is a longitudinal sectional view, partly in elevation, showing an energy absorption device made in accordance with another form of the invention;

FIG. 4 is a vertical cross-sectional view taken approximately in the planes of line 4—4 of FIG. 3;

Figure 8:
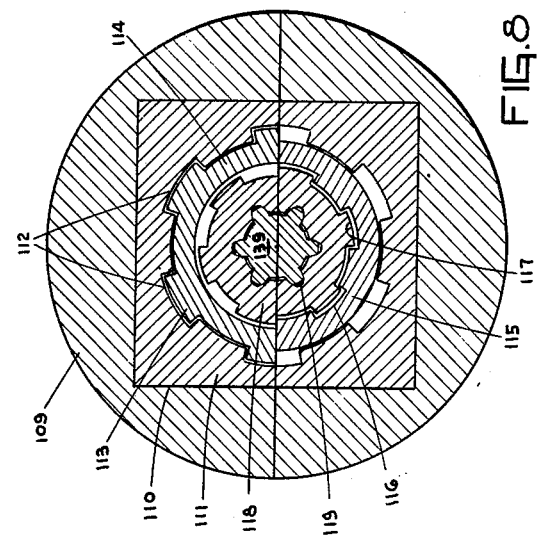
FIG. 8 is a vertical cross-sectional view taken approximately in the planes of line 8—8 of FIG. 7.

An energy absorption device made in accordance with the invention comprises a rigid housing or envelope which provides an internal chamber which has positioned therein a pair of rigid, concentrically arranged sleeves or sleeve-like members. The housing and one of the sleeves are constrained for relative movement or displacement with respect to one another in a linear or axial direction only. The housing and such coacting sleeve are respectively provided with, or have connected thereto, means at opposite ends of the device for attaching the device between two supporting members. Such constrained relative movement of housing and coacting sleeve may be obtained by providing their adjacent areas with mating polygonal surfaces. Preferably however, the housing and sleeve are provided with straight, longitudinally extending mating splines, which may have ball bearings positioned therein to reduce the effects of friction. The housing and sleeve may be displaced with respect to one another by a load applied in tension, causing the sleeve to move outwardly from within the housing, or by a compressive force, whereupon the sleeve is caused to slide further inwardly within the housing.

The second sleeve of the two concentrically arranged sleeves is mounted for rotation in response to the linear relative movement of the housing and the first-mentioned sleeve. The two sleeves are provided with cooperating friction means, preferably in the form of a plurality of friction discs carried by each of the sleeves, the discs carried by one of the sleeves being interleaved with the discs carried by the other sleeve. Resilient means is provided to act upon the friction means to resist the rotation of the second or rotatably mounted sleeve.

Preferably, means is provided for adjusting the resilient pressure applied to the coacting discs, whereby rotation of the second sleeve with respect to the first sleeve, through the intermediate friction means, will occur only when the force acting to displace the first sleeve with respect to the housing exceeds a predetermined amount. Thus, the device will act as a rigid member at loads below a predetermined value, but will absorb the energy resulting from a load in excess of the set, predetermined value. The device of the invention translates a load in excess of a predetermined value, whether applied in tension or compression, into a rotary motion which is imparted to and absorbed by the friction means. The heat rise is minimal, and the relationship of the parts permits a large amount of energy to be absorbed, though the displacement of the parts is comparatively small. After the device has exercised its function, the parts thereof are intact, and readily repositioned for reuse of the device.

In greater detail, reference is made to the form of the invention shown in FIGS. 1 and 2, wherein the illustrated energy absorbing device comprises a housing assembly 10 having an attaching shank 11, and a load carrying or reacting assembly 12 within the housing and having an attaching element 12a protruding from the end of the housing assembly remote from the shank 11. One of the attaching means, either the shank 11 or element 12a, may be attached to a support and the other attaching means attached to a reaction member or article to be supported. The means for attachment may be accomplished by any suitable means, such as apertured lugs, threaded or screw means, or the like.

Housing 10 includes an inner elongate body portion 13 surrounded by an outer sheath 14, the latter of which defines a cylindrical surface 15 of larger diameter than the outer cylindrical surface of the body 13 leaving an annular chamber therebetween. This chamber receives the major portion of the assembly 12 when the parts are in the normal unextended position, as shown. The sleeve or member 12, which functions like a piston within the housing, is provided with an inner end 20 having an enlarged head 21 thereon, the immediately adjacent portion of the piston being of materially reduced diameter and presenting a generally cylindrical surface 22.

The piston, which is of annular cross-section, has a series of axially straight flutes 23 formed in its inner surface originating at point 24 and extending through a sufficient distance to permit relative axial movement of the two parts 10 and 12, as hereinafter described. The outer surface 16 of body part 13 is also provided with axially straight flutes 25 corresponding in number and register with flutes 23 to jointly form keyways. As shown, these flutes longitudinally overlap when the parts are unextended and, in the fully extended position, it is intended that the flutes will be of sufficient length to accommodate for full movement of the parts.

Housed within the flutes 23 and 25 are series of balls 28 properly spaced with respect to each other by means of a straight cage element 29 which holds the balls captive to the extent of maintaining their spacing while permitting free rotation thereof. It is evident that the flute and ball combination as disclosed performs two separate functions, that of providing anti-friction means between members 10 and 12 and that of preventing relative rotation between the members.

The outer cylindrical surface 22 of the piston is provided with axial grooves, keyways or splines 30 originating at point 31 spaced from head 21 and extending from this point through to the remote end of the piston. This remote end of the piston is formed of reduced diameter and is externally threaded as at 32.

A second sleeve or reaction member indicated generally by the reference character 33 is housed within body 14 concentrically of member 12 and is provided with external flutes 34 of helical configuration which are aligned with helical internal flutes 35 in member 14. The chambers defined by these aligned pairs of flutes house series of balls 36 held in spaced apart relation by flat races 37.

The inner end 38 of the sleeve-like reaction member 33 is disposed in spaced relation to the piston head 21 and bears against the race 39 of an axial thrust bearing 40. The other race 41 of this bearing presents a face upon which one end of a compression spring means 42 seats, the opposite end of this means being seated against the opposed face 43 of the piston head 21. The spring means 42 preferably is in the form of a pack of Belleville disc springs.

The inner surface of the reaction member 33 has splines 44 which, in cooperation with the splines 30 in the piston member, effect means by which friction means in the form of relatively rotatable discs 45 and 46 are carried by the reaction member and piston member, respectively, as by means of keys or projections on said discs extending into the respective splines.

It will be noted that the stack of discs is engaged at one end against the race 39 of the axial thrust bearing 40 while the opposite end of the stack is engaged by a nut 50 threadedly engaged on the piston member and having a cylindrical end 51 extending between the two members 12 and 33. By varying the position of the nut, the loading of spring means 42 and consequently the loading on the discs 45 and 46 may be varied.

The device above described is characterized by its ability to dissipate high energy loads smoothly by reason of its particular arrangement of parts. That is to say, it will be noted that any force acting on piston 12 tending to move it to the left in FIG. 1 must overcome the resistance of the friction discs if any movement is to occur. When the piston moves, relative rotation between the housing 14 and reaction member 33 is necessitated which in turn causes relative movement between the preloaded friction discs 45 and 46.

Because of the particular construction used, movement of the piston 12 to the left in FIG. 1, that is, a very minute movement, causes the preloading force on the discs to diminish in magnitude. This occurs because this movement of the piston is permitted by compressing the spring means 42, and the nut 50 being rigid and movable with the piston, releases the loading on the discs until an equilibrium condition is reached, whereupon slippage occurs. In the latter condition, the reaction member 33 simultaneously rotates and moves to the left, thus permitting the thrust bearing race 39 to follow both the reaction member and the stack of discs until reestablishing the equilibrium preloading on the discs.

The operation of the device is always instantaneous, regardless of the loads applied. For example, if the load applied approaches shock loading proportions, a momentary condition may be reached wherein the nut 50 moves away from the stack of discs so suddenly that, for an instant, there will be practically no resistance to turning offered by the discs. The device, therefore, cannot jam or become locked under sudden shock loading or any other conditions.

A modified form of construction is shown in FIGS. 3 and 4, although the principles of operation remain the same. In this form, a housing 60 has internal axially aligned splines 61 and receives a cylindrical piston or reaction assembly 62 which has external splines 63 interengaging the housing splines 61 so as to be extensible relative thereto while relative rotation is prevented. At one end, the housing 60 has a neck 64 terminating in a threaded attachment nipple 65. The opposite end of the housing is open to permit the piston assembly 62 to project therethrough.

The piston assembly 62 conveniently comprises three parts to facilitate manufacture and assembly, namely, a cylinder or sleeve 66 having the external splines 63, an annular plug or head 66a removably secured to the inner end of the sleeve 66 and having splines 63a meshed with the splines 61 of the housing 60, and an outer anchoring head or plug 66b having an attachment nipple 65a and an enlarged externally threaded portion 67 threaded into a correspondingly internally threaded portion 67a within the outer end of the sleeve 66. The inner end of the outer plug 66b is undercut to provide an axially extending annular abutment ring 68.

The piston sleeve 66 is provided with axially straight internal splines 63b for a majority of its length, originating immediately adjacent the internally threaded portion 67a thereof. These splines 63b cooperate with correspondingly splined friction discs 69 which are interleaved with internally splined friction discs 70 carried on and keyed with external splines 71a of a reaction sleeve 71 concentrically disposed within the sleeve 66 and having internal helical splines or threads 71b. A reaction screw 75 is fixed concentrically within the housing 60 and includes a reaction portion 76 having external helical splines 76a interengaged with the splines 71b and extending the length of the reaction sleeve 71, a smooth shank 77 extending through the nut 66a and an enlarged head 78 having external splines 78a engaged with the internal splines 61 of the housing 60. Any means, such as a bolt 80, may be utilized to fix the reaction screw to housing 60, preventing axial movement therebetween. Thus, relative axial movement between the reaction sleeve and reaction screw will cause the sleeve to rotate within housing 60.

The inner portion 90 of the inner nut 66a may be externally threaded to adjustably cooperate with the internally threaded inner end 93 of the sleeve 66 and the inner end 92 of said portion 90 constitutes an abutment ring opposed to the ring 68 and between which is interposed the friction discs 69, 70, an axial thrust bearing 91 and spring means 97. Abutting the inner end of the reaction sleeve 71 and the assembly of discs 69, 70 is one race 95 of the axial thrust bearing 91, the other race 96 of which forms a seat for the spring means 97. In this case, the spring means may be formed of a pack of spring washers 98. As will be seen, the spring pack is captive between the thrust bearing race 96 and the abutment ring 92. The anchoring head 66b, on the other hand, since its ring 68 bears against the stack of friction washers 69, 70 determines the initial compression of the spring pack and consequently the initial loading on the friction discs.

The operation of the modified form is similar to that described in connection with the structure shown in FIGS. 1 and 2.

The sleeve 66, the anchoring head and pressure adjusting means 66b, the pack of friction discs 69, 70, the sleeve 71, the thrust bearing 91, the spring means 97, and the plug 66a provide a sub-assembly which is straight splined externally and helically splined internally. Without the housing 60 and the externally, helically splined or threaded screw member 76, the sleeve 71 would be free to slip axially within such sub-assembly. However, with the housing 60 and the screw 76 installed and fixed to one another at 78a and 80, the sub-assembly is secured in position.

At rest, the resilient pressure of the compressed spring pack 97 forces the friction discs 69 and 70 together, preventing rotation of the discs 70 splined for rotation with the rotatably mounted sleeve 71. The maximum force which is necessary to overcome the pressure engagement of the friction discs with one another is determined by the setting or position of the pressure adjusting head or nut 66b. With the device fixed to a supporting member at 65, and when an impact load in tension is applied in excess of this maximum value to the anchoring head 66b, a compressive force is applied to the resilient means 97, forcing the thrust bearing 91 against the internally threaded sleeve 71. This momentarily relieves some of the pressure on the friction discs providing a "momentary negative peak" during break-away. In this manner, a break-away peak load is avoided. The disc pressure and full friction loading is quickly restored as the sleeve 71 rotates with a rotary screw motion toward the left end of the screw 76 as viewed in FIG. 3. The friction between the discs 69 and 70 retards this rotary motion and converts the thrust energy into heat. The heat rise is negligible. In elongating the device, the peak deceleration is reduced to a safe value and the period of deceleration is substantially increased.

Once elongated, the device is removed from its mounting and then may be reset for reuse. This may be accomplished by unscrewing the bolt 80, thereby allowing the housing assembly 60 to be slipped off the inner assembly. The reaction screw assembly 75 is then screwed back into desired position in the sleeve 71. Such assembly is then inserted into the housing assembly 60, with the splines 78a and 63 received in the splines 61. The reassembly is completed by inserting and tightening up on the bolt 80. No change in the spring loading adjustment is necessary, unless it is desired to change the "cut off" value of the device, or the value above which it no longer acts as a rigid member but acts to absorb loadings in excess of the set value.

Figure 5:
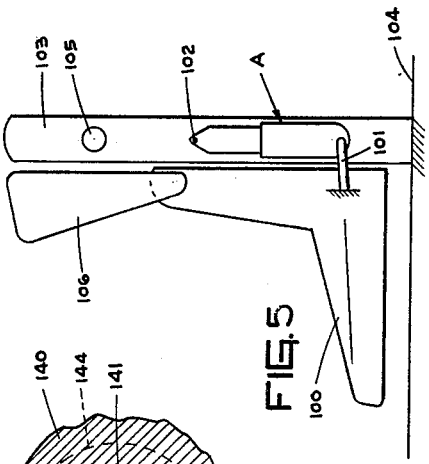
FIG. 5 is a schematic view of an aircraft seat and its supporting structure having in assembled relationship therewith an energy absorption device of the character shown in either FIG. 1 or FIG. 3.

The manner of mounting the device shown in FIGS. 1 and 2, or the device of FIGS. 3 and 4, with relation to an aircraft seat is illustrated in FIG. 5. Either of these devices, designated A, will elongate when subjected to an impact loading. A seat 100 is connected near its lower end to one end of the energy absorption device by means of a bracket 101. The attaching means may be an apertured lug or a threaded connection such as shown at 65 in FIG. 3. The opposite end of the device is fastened to a cross-bar 102 extending between a pair of laterally spaced standards or rails 103 (one of which is shown), which are secured to the frame or floor 104 of the aircraft. The connection between the energy absorption device and the standard may be through the medium of an apertured lug or a threaded connection such as 32 or 65a in FIGS. 1 and 3, respectively. As is common in these seat arrangements, a bar 105 is extended between the pair of spaced standards to rigidify the support for the seat. Also, as is common in the art, the seat is slidable vertically with respect to the spaced supporting standards, as by means of rollers (not shown). A linear actuator may be used to adjust the height of the seat with respect to the floor, and a face curtain 106 is secured to extend from the upper portion and from each side of the seat. FIG. 5 shows one energy absorption device as related to the seat. If desired, a second such device may be symmetrically arranged with respect to the opposite side of the seat instead of a single, central connection to one energy absorption device. In the event that the aircraft is involved in a crash, the motion of the seat and its occupant is linear, causing the relative movement and elongation of the parts, together with the absorption of energy caused by the impact loading in excess of the set value as hereinbefore described with regard to the devices illustrated in FIGS. 1 and 2, and FIGS. 3 and 4.

Figure 6:
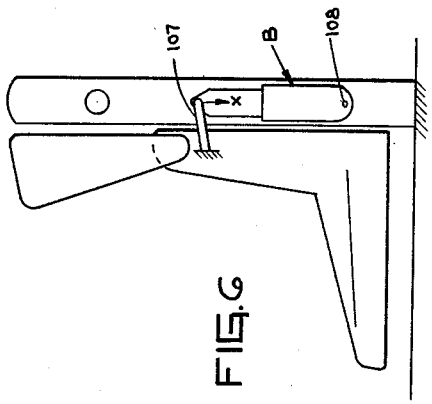
FIG. 6 is a view similar to FIG. 5, except that the seat is mounted to impart a compressive force to the related absorption device, rather than a force acting to elongate the device as with regard to an arrangement as shown in FIG. 5.

Another common form of seating arrangement for a pilot is illustrated in FIG. 6. Such seating arrangement is identical with the seating arrangement illustrated in FIG. 5, except that the seat is connected to the aircraft frame through the intermediate energy absorption device, designated B, by a connection near the top end of the seat. In such case, the bracket 107, there may be one on each side or a single central bracket, is connected to the energy absorption device so that the linear motion imparted to the seat and its occupant upon impact imparts a compressive force, rather than a force in tension, to the device. With the energy absorption device fixed to the standard at 108, a force in the direction of the arrow X is imparted to the device upon impact. The construction of an energy absorption device in accordance with the principles of the invention suitable for this type of seat mounting, and wherein the load is compressively applied, is illustrated in FIGS. 7, 8 and 9.

Figure 7:
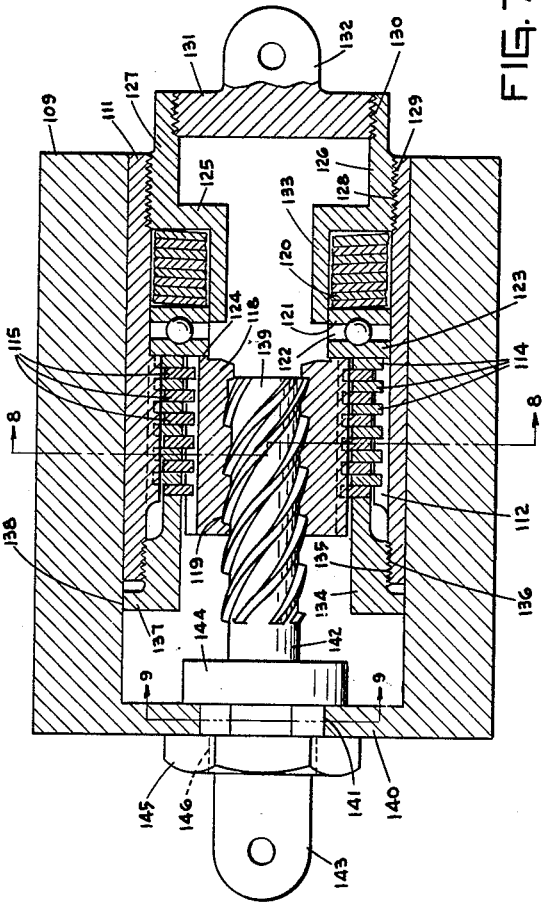
FIG. 7 is a longitudinal sectional view, partly in elevation, of an energy absorption device in accordance with another form of the invention, this form of device being adapted for assembly with a seat arrangement as shown in FIG. 6.
Figure 9:
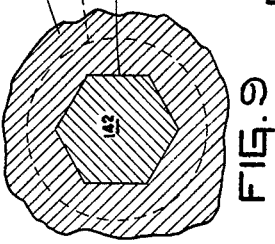
FIG. 9 is a cross-sectional view taken in the plane of line 9—9 of FIG. 7.

In the form of the invention illustrated in FIGS. 7, 8 and 9, the housing 109 is provided with an internal chamber 110. Instead of being internally splined, the housing may be of polygonal cross-section, here shown to be of square cross-section. It will, of course, be understood that the wall of the internal chamber may be of any other desired polygonal outline, for example, hexagonal. A sleeve 111 is constrained for straight axial sliding movement with respect to the housing by having the external surface thereof matingly contoured. The sleeve 111 has an annular internal wall which is provided with straight, longitudinally extending, internal splines 112 within which are matingly received the projections 113 of a series of friction discs 114. Alternating in assembly with the friction discs 114 are a series of friction discs 115. The friction discs 115 are provided with internal keys 116 which matingly receive straight, longitudinally extending, external splines 117 formed in the outer periphery of a sleeve 118 concentrically arranged with respect to the sleeve 111. The sleeve 118 is provided with internal, helical threads or splines 119. The internal helical thread has a lead larger than the friction angle of steel on steel.

In order to provide pressure resisting the rotation of the friction discs 115 with respect to the discs 114, resilient means 120, preferably in the form of a pack of Belleville spring discs, is provided. At one side thereof, the resilient spring means bears against a race 121 of a thrust bearing 122, the opposite race 123 providing a support for one end of the friction disc pack. The thrust bearing acts as a compression member and prevents rotation from being transmitted to the spring pack. Also, the race 123 bears against the end 124 of the rotatable sleeve 118. The opposite end of the spring pack bears against and is confined by a radially extending wall 125 of a member 126. The member 126 has an annular, longitudinally extending wall 127 defining the outer diameter thereof, such wall being externally threaded at 128 for mating engagement with an internally threaded portion 129 at the end of the sleeve 111. The wall 127 is internally threaded at 130 to matingly receive the externally threaded flange 131 of an apertured lug attaching member 132. The member 126, besides providing a bearing for the spring pack 120, also has an annular, longitudinally extending wall 133 on a reduced diameter which extends through the central opening of the pack of spring discs, thereby maintaining and confining the spring discs of the pack in desired position.

The resilient pressure exerted upon the pack of friction discs 114 and 115 through the thrust bearing 122 is reacted upon, and confined by, a pressure adjusting nut 134 which is adjustably connected to the sleeve 111. For this purpose, the pressure adjusting nut is externally threaded at 135 for mating connection with the internally threaded portion 136 at the adjoining end of the sleeve 111. The pressure adjusting nut is provided with a short, radially extending flange 137, the exterior surface 138 of which is provided with flats. In adjusting the pressure upon the friction pack, the nut 134 is rotated until the desired pressure is imposed upon the discs, the flats 138 being aligned with the flat surfaces provided by the external polygonal surface outline of the sleeve 111.

With the housing 109 and the helically threaded sleeve 118 removed, the other described parts represent a unitary sub-assembly in the sense that the parts thereof are connected to one another as a unit in equilibrium. When such sub-assembly is slid into the housing 109, it is confined for relative movement in a straight or axial direction, and the internally threaded member 118 may be slid in and out of such sub-assembly.

For cooperation with the internally threaded sleeve 118, a mating, externally threaded screw 139 is provided so that upon straight or linear movement of the described sub-assembly, relative rotation is obtained between the respective sets of friction discs 114 and 115. So that the relative rotation between the friction discs may be responsive to the displacement of the sub-assembly with respect to the housing, the screw 139 is fixed to the housing 109. This may be accomplished, as illustrated, by forming the housing at one end thereof with an integral, inturned flange 140 having a central opening 141. To prevent relative rotation between the screw and the housing, the opening in the housing is hexagonally formed, and the shank 142 of the screw member, which is extended through such opening, is correspondingly shaped to pass therethrough with a slight amount of clearance. The shank of the screw is provided at its extremity with attaching means in the form of an apertured lug 143. The screw's shank also is provided with a radially extending flange 144 which abuts the interior wall of the housing flange 140. The connection is completed by threading a nut 145 tightly up against the exterior wall of the housing flange 140, the screw shank being externally threaded at 146 for this purpose. In this manner, the assembly is secured in operative relationship. Relative rotation between the sets of friction discs is obtained when the sleeve 118 is rotated in response to the straight line or linear displacement of the sleeve 111 and its associated parts with respect to the housing and the screw fixed thereto.

When, as shown in FIG. 6, the seat is connected to the device by the bracket 107 and the opposite end of the device is connected to the frame of the aircraft, through a seat standard at 108, a compression force in the direction of the arrow X is reacted through the medium of the device shown in FIGS. 7 to 9 to produce the following internal reactions. The sleeve 111 wants to move linearly into the housing 109. The threaded sleeve 118 wants to rotate about the matingly threaded screw 139. Before there can be any motion however, the friction discs 115 must slip between the friction discs 114. When the device is not under any load, the force of the spring pack 120 is fully reacted between the members 126 and 134. When a compressive force is applied to one end of the device, the reaction of the threaded sleeve 118 through the thrust bearing 122 against the pressure exerted by the spring pack 120 reduces the reaction against the friction disc confining member 134 by the same amount; that is to say, an increase or decrease of force or axial load upon the device is inversely proportional to the force across the stack of friction discs 114 and 115. Therefore, at a predetermined value of the compressive force exerted upon the assembly, the force across the friction discs will be lowered sufficiently to allow slip between them, and motion in the direction of the compressive force begins. As slip occurs, the compressive force maintains its magnitude and the work done is absorbed in heat by the slipping friction discs.

It is believed that the various purposes and advantages of the invention will be apparent from the foregoing detailed description and illustration of several preferred embodiments of the invention. It will be apparent that various modifications and changes may be made without departing from the spirit and scope of the invention as sought to be defined in the following claims.

I claim:

1. An energy absorbing device comprising a housing providing an internal chamber, a sleeve positioned in the chamber, the housing and sleeve being constrained for relative movement in an axial direction, a second sleeve positioned in the chamber and concentrically arranged with respect to the first-mentioned sleeve, cooperating means associated with the housing and the second sleeve for imparting combined axial and rotary movement to the second sleeve responsive to the relative axial movement of said housing and first-mentioned sleeve, friction means carried by the second sleeve, and means carried by the second sleeve and acting upon the friction means to resist the rotation of the second sleeve.

2. An energy absorbing device comprising a housing providing an internal chamber, a sleeve positioned in the chamber, the housing and sleeve being constrained for relative movement in an axial direction, a second sleeve positioned in the chamber and concentrically arranged with respect to the first mentioned sleeve, cooperating means associated with the housing and the second sleeve for imparting combined axial and rotary movement to the second sleeve responsive to the relative axial movement of said housing and first-mentioned sleeve, a plurality of friction discs carried by each of the sleeves, the discs carried by one of the sleeves being interleaved with the discs carried by the other sleeve, and resilient means urging the discs together to resist the rotation of the second sleeve.

3. An energy absorbing device comprising a housing providing an internal chamber, a sleeve positioned in the chamber, the housing and sleeve being constrained for relative movement in a straight axial direction, a second sleeve concentrically arranged with respect to the first-mentioned sleeve, a set of friction discs splined to the first-mentioned sleeve, a set of friction discs splined to the second sleeve, the discs splined to the respective sleeves being interleaved with one another, cooperating means associated with the housing and the second sleeve for imparting combined axial and rotary movement to the second sleeve responsive to the relative movement of said housing and first-mentioned sleeve, and resilient means urging the discs together to resist the rotation of the second sleeve, said resilient means exerting an axial thrust against said second sleeve.

4. An energy absorbing device comprising a housing providing an internal chamber, a sleeve positioned in the chamber, the housing and sleeve being constrained for relative movement in a straight axial direction, a second sleeve concentrically arranged with respect to the first mentioned sleeve, a set of friction discs splined to the first-mentioned sleeve, a set of friction discs splined to the second sleeve, the discs splined to the respective sleeves being interleaved with one another, cooperating means associated with the housing and the second sleeve for imparting combined axial rotary movement to the second sleeve responsive to the relative movement of said housing and first-mentioned sleeve, resilient means urging the discs together to resist the rotation of the second sleeve, said resilient means exerting an axial thrust against said second sleeve, and means for adjusting the resilient pressure upon the discs and upon the second sleeve.

5. An energy absorbing device comprising a housing providing an internal chamber, a sleeve positioned in the chamber, the housing and sleeve being constrained for relative movement in a straight axial direction, a second sleeve positioned within the first-mentioned sleeve, a set of friction discs splined to the interior of the first-mentioned sleeve, a set of friction discs splined to the exterior of the second sleeve, the discs splined to the respective sleeves being interleaved with one another, said second sleeve being threaded internally, screw means fixed to the housing matingly received within said second sleeve, and resilient means urging the discs together to resist the rotation of the second sleeve, said resilient means exerting an axial thrust against said second sleeve.

6. An energy absorbing device comprising a housing providing an internal chamber, a sleeve positioned in the chamber, the housing and sleeve being constrained for relative movement in a straight axial direction, means respectively associated with the housing and the sleeve at opposite ends of the device for attaching the device between supporting members, a second sleeve positioned within the first-mentioned sleeve, a set of friction discs splined to the interior of the first-mentioned sleeve, a set of friction discs splined to the exterior of the second sleeve, the discs splined to the respective sleeves being interleaved with one another, said second sleeve being threaded internally, screw means fixed to the housing matingly received within said second sleeve, resilient means urging the discs together to resist the rotation of the second sleeve, said resilient means exerting an axial thrust against said second sleeve, and means for adjusting the resilient pressure upon the discs and upon the second sleeve.

7. An energy absorbing device comprising a housing providing an internal chamber, a sleeve positioned in the chamber, the housing and sleeve being constrained for relative movement in a straight axial direction, means respectively associated with the housing and the sleeve at opposite ends of the device for attaching the device between supporting members, a second sleeve positioned within the first-mentioned sleeve, a set of friction discs splined to the interior of the first-mentioned sleeve, a set of friction discs splined to the exterior of the second sleeve, the discs splined to the respective sleeves being interleaved with one another, said second sleeve being threaded internally, screw means fixed to the housing within said second sleeve, a thrust bearing having one race thereof in engagement with the pack of friction discs and the end of the second sleeve, the opposite race being engaged by spring means, the opposite side of the spring means being confined by a bearing member connected to said first sleeve at one end thereof, and a nut for adjusting the spring pressure upon the friction discs and the second sleeve adjustably connected to the opposite end of said first sleeve.

8. An energy absorbing device comprising a housing and a piston fitted slidably within said housing, the piston and housing having means at opposite ends of the device for attaching the same between two members, a reaction member within said housing, means interconnecting the piston and housing constraining the piston for straight axial movement relative to said housing, a plurality of friction discs carried on said piston, a plurality of friction discs carried by said reaction member, the first-mentioned friction discs being interleaved with the second-mentioned friction discs, means carried by said piston resiliently urging all of said discs together, means interconnecting the housing and reaction members constraining the reaction member for combined rotary and axial movement relative to said housing.

9. An energy absorbing device comprising a housing and a piston fitted slidably within said housing, the piston and housing having means at opposite ends of the device for attaching the same between two members, a reaction member within said housing, means interconnecting the piston and housing constraining the piston for straight axial movement relative to said housing, a plurality of friction discs carried on said piston, a plurality of friction discs carried by said reaction member, the first-mentioned friction discs being interleaved with the second-mentioned friction discs, means carried by said piston resiliently urging all of said discs together and including an axial thrust bearing simultaneously engaging one end of the stack of friction discs and one end of said reaction member, means interconnecting the housing and reaction member constraining the reaction member for combined rotary and axial movement relative to said housing.

10. An energy absorbing device comprising a housing and a piston fitted slidably within said housing, the piston and housing having means at opposite ends of the device for attaching the same between two members, a reaction member within said housing, means constraining the piston for straight axial movement relative to said housing, a plurality of friction discs carried on said piston, a plurality of friction discs carried by said reaction member, the first-mentioned friction discs being interleaved with the second-mentioned friction discs, means carried by said piston resiliently urging all of said discs together and including an axial thrust bearing simultaneously engaging one end of the stack of friction discs and one end of said reaction member and spring means acting between a portion of said piston and said thrust bearing to urge such bearing against the disc pack and the reaction member, means interconnecting the housing and reaction member constraining the reaction member for combined rotary and axial movement relative to said housing.

11. An energy absorbing device comprising a pair of elongate relatively extensible members movable between a collapsed position, one within the other, and a relatively extended position, a stack of friction discs carried by one of said members, means on such one member resiliently compressing said stack, a reaction member extending the length of said stack with the individual discs of the stack being alternately fixed against rotation to said one member and said reaction member respectively, and means interconnecting said reaction member and said one member for imparting relative rotation between said reaction member and said one member in response to extension between said two members, and means interconnecting said one member with the other member constraining movement between the same to substantially straight axial movement.

12. An energy absorbing device comprising a pair of elongate relatively extensible members movable between a collapsed position, one within the other, and a relatively extended position, a stack of friction discs carried by one of said members, means on such one member resiliently compressing said stack, a reaction member extending the length of said stack with the individual discs of the stack being alternately fixed against rotation to said one member and said reaction member respectively, and means interconnecting said reaction member and said one member for imparting relative rotation between said reaction member and said one member in response to extension between said two members, the first-mentioned means including an axial thrust bearing simultaneously bearing against said stack and said reaction member, and also including spring means acting between said thrust bearing and said one member to urge the thrust bearing against the stack and reaction member, and means interconnecting said one member with the other member constraining movement between the same to substantially straight axial movement.

13. An energy absorbing device comprising a housing, a piston and a reaction member, all telescopically nested together for relative axial movement between the piston and housing, means interconnecting the piston and housing to constrain movement therebetween to a substantially straight line axial movement, means interconnecting the reaction member and said housing to impart relative rotation therebetween as said piston and said housing are moved axially relative to each other, and friction means including paired elements carried by said piston and reaction members resisting relative rotary movement between the piston and the housing.

References Cited in the file of this patent

UNITED STATES PATENTS

| | | |
|---|---|---|
| 1,952,902 | Barros | Mar. 27, 1934 |
| 2,471,857 | Bleakney et al. | May 31, 1949 |
| 2,856,179 | Hogan | Oct. 14, 1958 |